Jan. 29, 1952          C. J. CROWLEY          2,583,728
METHOD OF MAKING RUBBER GLOVES AND LIKE ARTICLES
Original Filed Aug. 6, 1942          2 SHEETS—SHEET 1
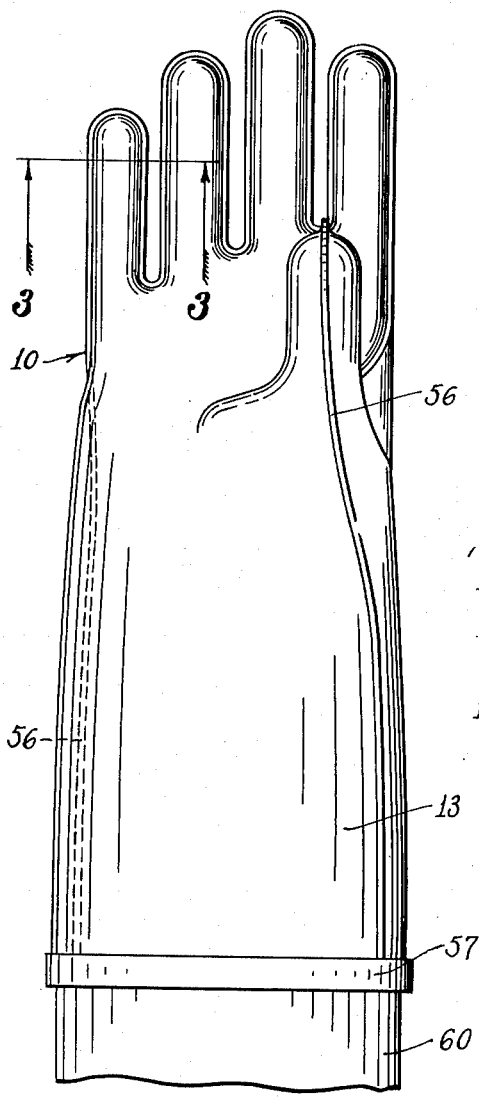
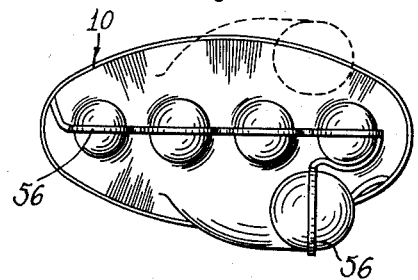
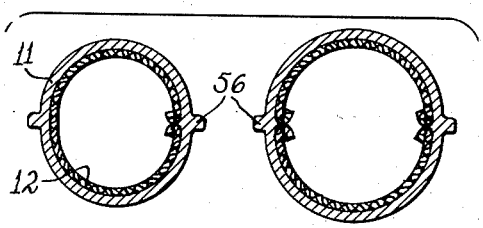
Inventor
Cornelius J. Crowley
By Pochuckle & Bartholow
Attorneys.

Jan. 29, 1952 C. J. CROWLEY 2,583,728
METHOD OF MAKING RUBBER GLOVES AND LIKE ARTICLES
Original Filed Aug. 6, 1942 2 SHEETS—SHEET 2
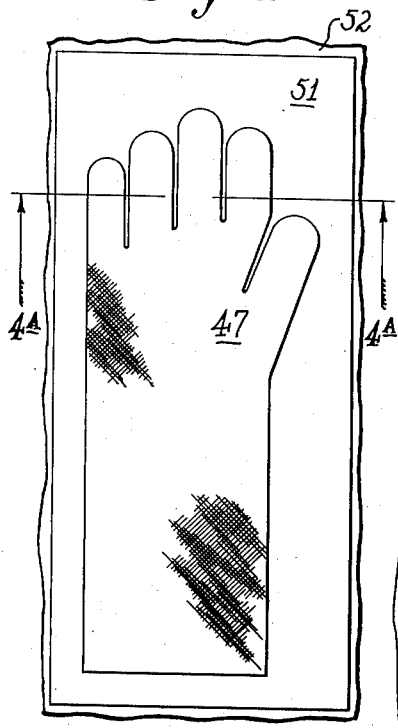
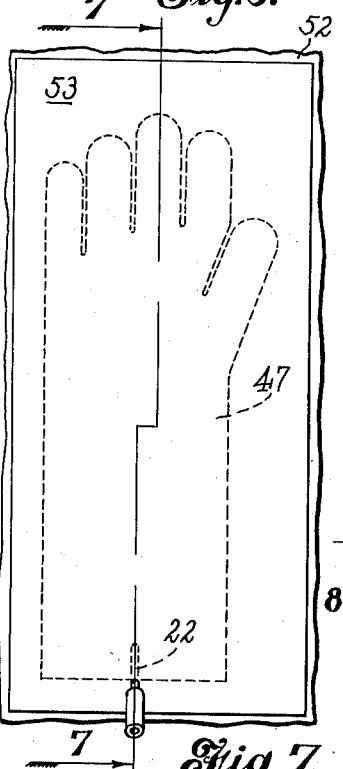
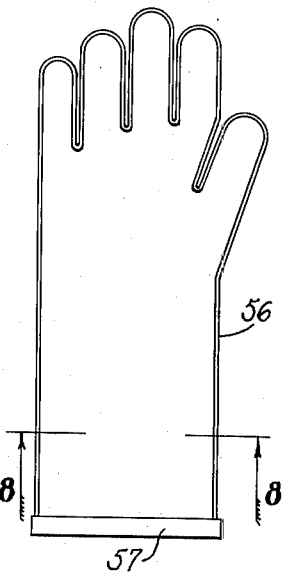
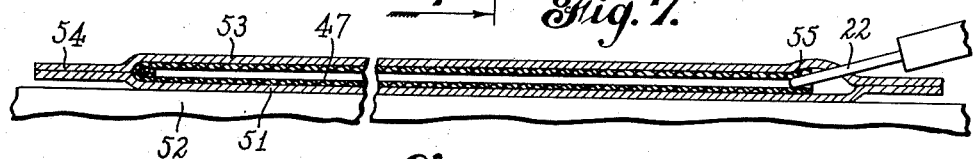
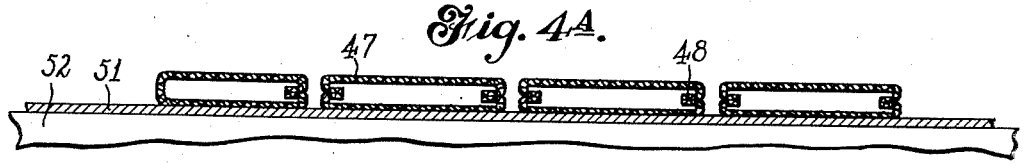
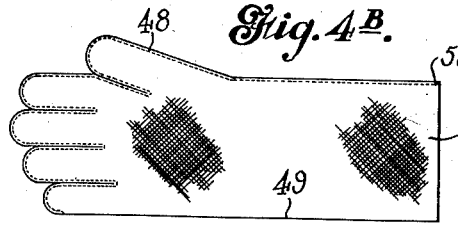
Inventor
Cornelius J. Crowley
By Rafauk &t Bartholow
Attorneys Patented Jan. 29, 1952

2,583,728

UNITED STATES PATENT OFFICE 2,583,728

METHOD OF MAKING RUBBER GLOVES AND LIKE ARTICLES

Cornelius J. Crowley, New Haven, Conn., assignor to The Seamless Rubber Company, New Haven, Conn., a corporation of Connecticut Original application August 6, 1942, Serial No. 453,820. Divided and this application January 11, 1944, Serial No. 517,794

9 Claims. (Cl. 154—110)

This invention relates to methods of making rubber gloves and like articles, the present application being a division of my application, Serial No. 453,820, filed August 6, 1942, now abandoned.

The invention relates to steps involved in the manufacture of articles, of the kind indicated, from rubber, the term "rubber" being used in a broad sense so as to include rubber-like material that may be employed in place of natural rubber.

One of the objects of the invention is to provide an improved process of manufacture so as to speed up the production of the articles and lower the cost.

Another object is to provide an improved procedure particularly applicable to goods such as work gloves and gloves of a similar class having a relatively heavy rubber wall.

To these and other ends, the invention consists in the novel features, steps, and procedures to be hereinafter described and finally pointed out in the claims.

In the accompanying drawings:

Fig. 1 is an elevational view, looking toward the palm portion, showing a glove made by the improved process, said glove being mounted upon a form;

Fig. 2 is a top plan view of the parts shown in Fig. 1;

Fig. 3 is an enlarged section on line 3—3 of Fig. 1; and

Figs. 4, 4<sup>A</sup>, 4<sup>B</sup>, 5, 6, 7 and 8 are views showing certain steps in the method of production, as hereinafter described, Fig. 4<sup>A</sup> being a section on line 4<sup>A</sup>—4<sup>A</sup> of Fig. 4, and Figs. 7 and 8 being sections on the line 7—7 of Fig. 5 and the line 8—8 of Fig. 6, respectively.

The glove selected for illustration is a work glove having a textile liner, and in Figs. 1 and 2 of the drawing this glove, which is generally indicated at 10, is shown as it appears when mounted upon a form 60 to which it conforms. This glove has a relatively heavy outer wall or layer 11 of rubber or rubberlike material, as appears from Fig. 3, and within the rubber wall is a textile liner 12 which may be made of stockinet, for example. The fingers of the glove are intended to fit over the fingers of the hand rather loosely, and with this in view preferably have a cross-sectional shape such as shown in Fig. 3, it being aimed to prevent any binding or constriction of the fingers; and the same observations apply equally to the thumb of the glove, which in cross section is similar to the fingers. The glove selected for illustration has a rather long wrist portion 13 so as to provide a gauntlet-type glove, but in this respect considerable variation may be made. A characteristic of the particular glove shown in the drawings is the flange 56, which in this particular instance extends continuously along the side portions of the glove body and along the sides of the fingers and the sides of the thumb. This flange 56 is in one piece with the rubber wall, and in the location specified, provides an increase in the cross-sectional area of the wall, as indicated, for example, in Fig. 3. A finishing strip 57 of rubber or rubberlike material may be adhesively secured to the outer surface of the glove adjacent the edge of the wrist portion, as shown in Fig. 1.

In producing a glove of this kind the procedure may be, for example, as follows: First, I procure a textile liner in glove form, preferably made of fairly heavy and dense stockinet or like fabric, this liner being indicated at 47 in Fig. 4<sup>B</sup>. The liner is preferably made from a single sheet cut and folded, and adapted to be sewed to give the shape of a flat liner having the fingers and thumb in one plane. Fig. 4<sup>B</sup> shows the liner as first made, with a sewed seam 48 at the margin, the edges of the material being outwardly disposed. The liner has a continuous closed side 49 (where the material is folded) extending up to the end of the little finger, and the seam 48 runs continuously from the end of the little finger to the liner end on the thumb side, where the end of the seam is indicated at 50. After the liner has been made in this way it is turned inside out, so that the edges of the seams of the fingers and thumb are at the inner side, and this is shown in Fig. 4 and Fig. 4<sup>A</sup>.

In Figs. 4 and 4<sup>A</sup> the process is shown at a stage when the liner is placed flatwise against a sheet 51 of rubber or rubberlike material, which sheet in turn is supported against the upper face of a table member or bench portion 52. Before laying the liner on the rubber sheet, however, it is preferred to wet the liner with a suitable solvent, for example, naphtha solvent of say 68° Baumé. When the liner is laid on the rubber sheet the solvent immediately commences the softening of the adjacent rubber, and this is for the purpose of facilitating an effective bond between the elastic wall and the fabric wall, as hereinafter described. If desired, a small amount of rubber cement may be incorporated in the solvent. The next step after that shown in Fig. 4 is to lay a second rubber or rubberlike sheet 53 flatwise on the liner, as shown in Fig. 5, and this is pressed down, by hand or otherwise, so that around the perimeter of the liner the two sheets make face contact with each other. The sheets are pressed together all around the liner adjacent the liner margin so as to provide a firm adhesive, sealing connection at all points. In this manner there is formed an air seal completely around the margin of the blank.

The next step is to evacuate the air from the blank, and this is preferably done by the use of a suction needle 22 employed in the manner shown in Figs. 5 and 7. In Fig. 7 the marginal sealed portion extending around the glove liner is indicated at 54. The point of the needle 22 is inserted through the rubber wall at the upper part of the blank and at the inner side of the seal so that the needle point extends slightly into the open mouth portion 55 of the liner at the open rear or wrist end thereof, in the manner shown in Fig. 7.

The next step is to suck the air out of the blank by way of the needle. The liner, being made of stockinet or like material is, of course, quite pervious, and with the needle in a position such as shown in Fig. 7, the effect of the partial vacuum is to suck the rubber wall strongly against, and, in fact, partly into, the wall of the liner. This operation is, of course, assisted by the previous softening of the rubber, as above described. With a vacuum of twenty-six inches, for example, the rubber is strongly drawn into the interstices of the fabric. The interior of the blank may be subjected to the suction operation during a period, say, of one minute. This will conform the rubber very effectively to the liner, and after the removal of the needle and the plugging of the needle hole with a small piece of rubber the article is preferably allowed to set, say for a few hours.

In the suction operation the opposing portions of rubber between the fingers, and between the thumb and the index finger, will be fully drawn together so as to meet and be adhesively secured together in the spaces referred to, forming in these locations two-ply layer or web portions.

After the resting or setting period has been completed, following the removal of the needle, the next step is the trimming of the article. This can be performed in any preferred manner, as by running a suitable knife all the way around the margin of the liner, except at the rear end. The rear end of the blank is cut off so as to open up the blank, the cut usually being made across the rear end portion of the liner. The effect of running the knife along the margin of the blank at the sides, and along the margins of the fingers and the margin of the thumb, is to provide the outstanding rubber flange 56, previously referred to. Preferably the trimming is rather close, so that the projection of the flange will be rather slight. Fig. 8 shows how the flange projects from the glove body at opposite sides, and it illustrates the generally flat condition of the blank at this stage. The liner 47, as will be understood, extends all the way to the open end of the glove blank, and its seams are directed inwardly so that a smooth uniform layer of rubber will be applied at the outer face of the liner, and it will be understood, of course, that in the condition shown in Figs. 6 and 8, where the blank has been trimmed and opened up at the wrist end (and the finishing strip 57 applied), the opposite face portions of the glove will not stick together because of their being spaced from each other by the liner.

After the stage of Fig. 6 has been reached, the next step is to form the flat blank so as to shape it to the desired final shape, with the fingers and thumb rounded in cross section, and the thumb in the proper relation to the fingers for a right-hand glove or a left-hand glove as the case may be. It is immaterial whether one face or the other of the blank be used for the palm portion of the glove, but the thumb, which in the blank of Fig. 6 is in the same plane as the fingers, should not only be shaped but moved over or offset to take the usual thumb position customary in gloves. In doing this a glove form is used such as shown at 60 in Fig. 1, this form being such that when the glove is conformed to it, as shown in Fig. 1, the glove will have the proper shape. In other words, the fingers and thumb will be shaped as previously described, and the body of the glove given a generally elliptical cross section, as indicated in Fig. 2, and the thumb brought into proper relation to the fingers. The form 60 will be used in making a right-hand glove. A similar form having the thumb portion in the dotted-line position shown in Fig. 2 will be employed for making a left-hand glove.

The conformity of the blank to the form is produced by manual pressure and manipulation. Usually vulcanization takes place by the application of heat while the glove is on the form to which it has been shaped, the rubber or rubberlike material having had admixed therewith suitable ingredients for vulcanizing. In the process of vulcanizing, the two-part rubber flange formed by the adhesive connection along the margins of the two pieces of rubber or rubberlike material, is flowed into a single piece, as shown in Fig. 3, where certain portions of this flange appear.

By the process described a very strong and rugged glove structure is provided. It will be seen that the procedure is very simple as compared to prior processes in which fabric-covered rubber had to be cut and fitted and the fairly numerous pieces properly secured together by lap joints or the like in order to form a glove of the desired shape. By the present method much less labor is required and much less skill on the part of the operator, and a further result is that production is speeded up and expense lowered.

It is to be explicitly understood that the term "rubber" is used herein in a broad sense, and that rubberlike materials may be employed in place of natural rubber.

It is to be understood that I have described herein a preferred form of glove and a preferred method of procedure, this being by way of example only. Various modifications and changes can be made without departure from the principles of the invention or the scope of the claims.

What I claim is:

1. A method of making a glove having thumb and fingers, which comprises providing a hollow textile liner having thumb and fingers, applying over the liner plastic material in sheet form to enclose the liner in an air-tight manner, exhausting the air from the interior of the article through an opening formed through the plastic wall in order to conform the plastic material to the liner, opening the article at the wrist portion, and then shaping up the article to round up the fingers and place the thumb in offset position.

2. The method of making a rubber glove having a thumb and fingers, which comprises providing a flexible hollow pervious liner having a thumb and fingers, applying over the liner rubber in sheet form to create an air-tight enclosure, exhausting the air from the interior of the blank to conform the rubber to the liner, opening the blank at the wrist portion, shaping on a form, and vulcanizing.

3. The method of making a rubber glove, which comprises making a flat hollow blank of soft uncured rubber having the fingers and thumb all in one plane, shaping the blank on a form to create a right-hand glove or a left-hand glove as may be desired, and then curing.

4. The method of making a rubber glove, which comprises making a flat hollow blank of soft uncured rubber provided with fingers and a thumb all in one plane, and shaping the blank on a form to round the cross section of the fingers and thumb.

5. The method of making a rubber glove, which comprises making from two opposed pieces of soft uncured sheet rubber stock a flat hollow blank having fingers and a thumb all in one plane, then shaping the blank on a form to create a right-hand glove or a left-hand glove as may be desired by placement of the thumb in the proper position, and then curing.

6. The method of making a rubber glove, which comprises making a flat hollow blank of uncured rubber with fingers and a thumb all in one plane by steps which include adhesively interconnecting two opposing pieces of uncured sheet rubber, then shaping the blank on a form to bring it more closely to hand shape, and then curing.

7. The method of making a rubber glove, which comprises providing a hollow textile liner having a thumb and fingers in one plane, applying over the liner sheet rubber stock so as to create a covering layer enclosing the liner in an air-tight manner, exhausting the air from the interior of the blank to conform the rubber to the liner, and along the margins of each finger and the thumb, trimming the blank along the margins of the liner including the margins of the fingers and thumb, cutting off the blank at the wrist end in order to open it, and placing the opened blank over a hand-shaped form and shaping it thereto.

8. The method of making a glove which comprises conforming an envelope of uncured but curable plastic material by suction to a hand-shaped flexible pervious liner for the glove which is completely enclosed by the envelope, then opening the blank at the wrist end, and then curing.

9. A method such as set forth in claim 8 in which, prior to the curing step, the blank is brought more closely to hand shape by placing it on a form of proper shape to thereby round the fingers and place the thumb in the desired position with respect to the other parts of the glove.

CORNELIUS J. CROWLEY.

REFERENCES CITED

The following references are of record in the file of this patent:

UNITED STATES PATENTS

| Number | Name | Date |
|---|---|---|
| 1,263,462 | Payne | Apr. 23, 1918 |
| 1,308,014 | Price | June 24, 1919 |
| 1,309,485 | Price | July 8, 1919 |
| 1,387,728 | Kramer | Aug. 16, 1921 |
| 1,469,029 | Underwood et al. | Sept. 25, 1923 |
| 1,538,262 | Ackerman | May 19, 1925 |
| 1,607,964 | Patterson | Nov. 23, 1926 |
| 1,894,066 | Smith | Jan. 10, 1933 |
| 1,939,852 | Howard | Dec. 19, 1933 |
| 2,311,547 | Hutchinson | Feb. 16, 1943 |
| 2,429,121 | Crowley | Oct. 14, 1947 |
| 2,429,122 | Crowley | Oct. 14, 1947 |

FOREIGN PATENTS

| Number | Country | Date |
|---|---|---|
| 697,536 | Germany | Jan. 23, 1937 |